(12) United States Patent
Houle et al.

(10) Patent No.: US 8,378,534 B2
(45) Date of Patent: Feb. 19, 2013

(54) LIQUID COOLING ARRANGEMENT FOR ELECTRIC MACHINES

(75) Inventors: Martin Houle, Laval (CA); George Bursuc, Brossard (CA); Sebastien Bigras, Montréal (CA); Bruno Carpentier, St-Basile-le-Grand (CA)

(73) Assignee: TM4 Inc., Québec (CA)

( * ) Notice: Subject to any disclaimer, the term of this patent is extended or adjusted under 35 U.S.C. 154(b) by 548 days.

(21) Appl. No.: 12/686,061

(22) Filed: Jan. 12, 2010

(65) Prior Publication Data

US 2010/0176669 A1 Jul. 15, 2010

Related U.S. Application Data

(60) Provisional application No. 61/193,957, filed on Jan. 13, 2009.

(51) Int. Cl.
*H02K 9/00* (2006.01)
(52) U.S. Cl. .......................................... 310/54
(58) Field of Classification Search .................... 310/52, 310/54, 58, 64
See application file for complete search history.

(56) References Cited

U.S. PATENT DOCUMENTS

| 4,814,651 | A | 3/1989 | Elris et al. | |
|---|---|---|---|---|
| 6,960,851 | B2 | 11/2005 | Poulin et al. | |
| 6,992,411 | B2 | 1/2006 | Houle et al. | |
| 7,402,924 | B2 | 7/2008 | Bibeau et al. | |
| 7,471,023 | B2 * | 12/2008 | Roundell | 310/91 |
| 7,474,021 | B2 | 1/2009 | Perrin | |
| 7,635,932 | B2 * | 12/2009 | Matin et al. | 310/58 |
| 7,906,878 | B2 * | 3/2011 | Fleming et al. | 310/52 |

FOREIGN PATENT DOCUMENTS

CA 2 417 405 7/2004

* cited by examiner

*Primary Examiner* — Nguyen N Hanh
(74) *Attorney, Agent, or Firm* — Fay Kaplun & Marcin, LLP (57) ABSTRACT

A liquid cooling arrangement for electric machines uses a continuous cooling tube associated with a heat storing element. The cooling tube has a serpentine configuration and the heat storing element includes longitudinal slots starting from both longitudinal ends of the heat storing element. Accordingly, it is possible to slightly deform the heat storing element to properly position it into the internal stator of an electric machine. An internal biasing assembly may be used to force the external surface of the heat storing element to the internal surface of the stator.

28 Claims, 10 Drawing Sheets

FIG. 10 ional Patent Application Ser. No. 61/193,957 Filed on Jan. 13, 2009 the specification of which is expressly incorporated herein, in its entirety, by reference.

LIQUID COOLING ARRANGEMENT FOR ELECTRIC MACHINES

PRIORITY CLAIM

This application claims the benefit of U.S. Provisional Patent Application Ser. No. 61/193,957 Filed on Jan. 13, 2009 the specification of which is expressly incorporated herein, in its entirety, by reference.

FIELD

The present invention relates to electric machines. More specifically, the present invention is concerned with a liquid cooling arrangement for electric machines and with electric machines provided with such a liquid, cooling arrangement.

BACKGROUND

Electric machines, motors or generators, are well known in the art. It is also widely known that electric machines generate heat as a by-product and that this heat must be somehow extracted from the machine to improve the performance of the machine and/or prevent early degradation or failure thereof.

Electric machines are often air-cooled. This is easily done by providing apertures in the body of the machine to force air therethrough. The efficiency of such a cooling arrangement is poor since air is a generally low efficiency cooling fluid. Furthermore, some electric machines operate in environments that are such that it is not possible to provide an electric machine with apertures to allow air therein. Accordingly, fluid cooling arrangements for electric machines have also been designed.

Some permanent magnet electric machines are provided with an internal stator and an external rotor generally enclosing the stator. When this is the case, the stator has a generally cylindrical body and coils are so mounted to the cylindrical body as to outwardly produce a magnetic field that interacts with the externally provided rotor. Since the heat is generally generated in the stator that is somewhat enclosed by the rotor, it may be difficult to install a fluid cooling arrangement inside an enclosed stator of such an external rotor electric machine.

DETAILED DESCRIPTION

In accordance with an illustrative embodiment, there is provided a liquid cooling arrangement to be inserted in the internal stator of an electric machine, the internal stator being provided with an internal surface, the liquid cooling arrangement comprising:

a tubular body provided first and second longitudinal ends and an external surface so configured and sized as to be applied to the internal surface of the internal stator; the first and second longitudinal ends include expansion slots allowing deformation of the tubular body; the tubular body also includes a cooling path provided with a fluid inlet and a fluid outlet;

a biasing assembly so configured and sized as to bias the external surface of the tubular body against the internal surface of the internal stator.

According to another aspect, there is provided an electric machine comprising:

an internal stator provided with an internal surface;

an external rotor coaxially mounted about the internal stator; and a liquid cooling arrangement inserted in the internal stator, the liquid cooling arrangement comprising:

a tubular body provided first and second longitudinal ends and an external surface so configured and sized as to be applied to the internal surface of the internal stator; the first and second longitudinal ends include expansion slots allowing deformation of the tubular body; the tubular body also includes a cooling path provided with a fluid inlet and a fluid outlet; and a biasing assembly so configured and sized as to bias the external surface of the tubular body against the internal surface of the internal stator.

The present description refers to other documents listed throughout the present disclosure. These documents are hereby incorporated by reference in their entirety.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "about" is used to indicate that a value includes an inherent variation of error for the device or the method being employed to determine the value.

An object is therefore to provide a liquid cooling arrangement for electric machines.

It is to be noted that the expression "electric machine" is to be construed herein as encompassing both electric motors and electric generators disregarding the technology used in these machines.

Other objects, advantages and features will become more apparent upon reading of the following non-restrictive description of illustrative embodiments thereof, given by way of example only with reference to the accompanying drawings.

Generally stated, cooling arrangements according to illustrative embodiments use a cooling tube associated with a heat storing element. The cooling tube has a serpentine configuration and the generally cylindrical heat storing element includes longitudinal slots starting from both longitudinal ends of the heat storing element. Accordingly, it is possible to slightly deform the heat storing element to properly position it into the internal stator of an electric machine. Furthermore, the longitudinal slots allow the material of the heat storing element to contract and expand at a different rate than the material forming the stator of the electric machine without undue deformation of the stator and without contact loss occurring between these elements. An adequate heat transfer between the heat storing element and the stator is therefore possible while allowing the use of different materials forming these elements. A biasing assembly may be used to force the external surface of the heat storing element against the internal surface of the stator.

Turning now to FIGS. 1 to 6, a liquid cooling arrangement 10 according to a first illustrative embodiment will be described.

Figure 1:
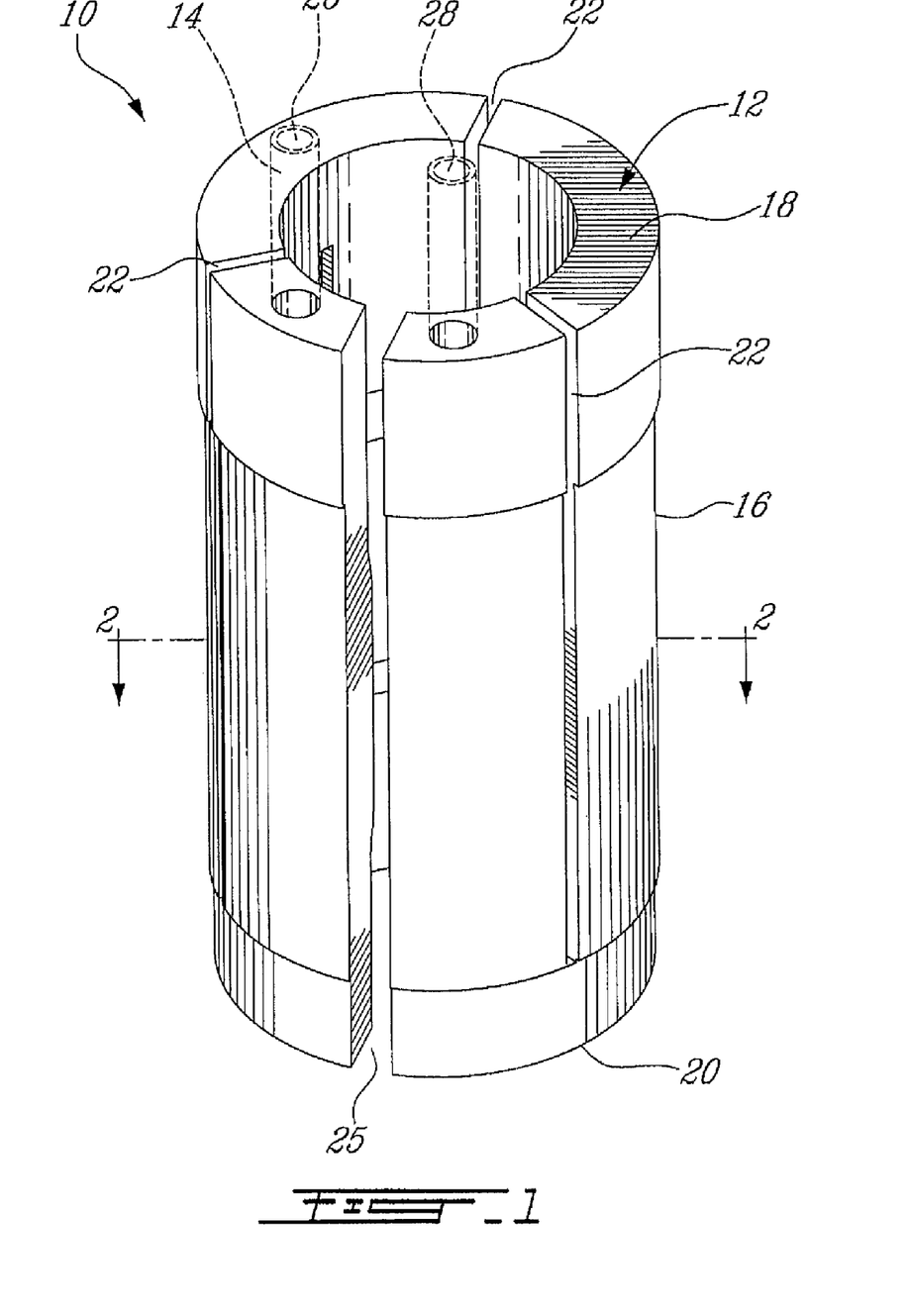
FIG. 1 is a perspective view of a liquid cooling arrangement according to a first illustrative embodiment.

The liquid cooling arrangement 10 includes a heat storing element in the form of a tubular body 12 and a cooling path in the form of a continuous serpentine cooling tube 14 embedded in the tubular body 12.

The tubular body 12 is generally C-shaped and includes an external surface 16 and first and second longitudinal ends 18 and 20. Three expansion slots 22 are provided from the first longitudinal end 18 and two expansion slots 24 are provided from the second longitudinal end 20 (see FIG. 2). The expansion slots 22 are open to the first longitudinal end 18 but do not reach the second longitudinal end 20. Conversely, as can be better seen from the bottom plan view of FIG. 3, the expansion slots 24 are open to the second longitudinal end 20 but do not reach the first longitudinal end 18.

The C-shape of the tubular body 12 is defined by a larger slot 25 open to both longitudinal ends 18 and 20.

The serpentine cooling tube 14, shown in dashed lines in FIG. 1, includes a fluid inlet 26 and a fluid outlet 28.

Figure 2:
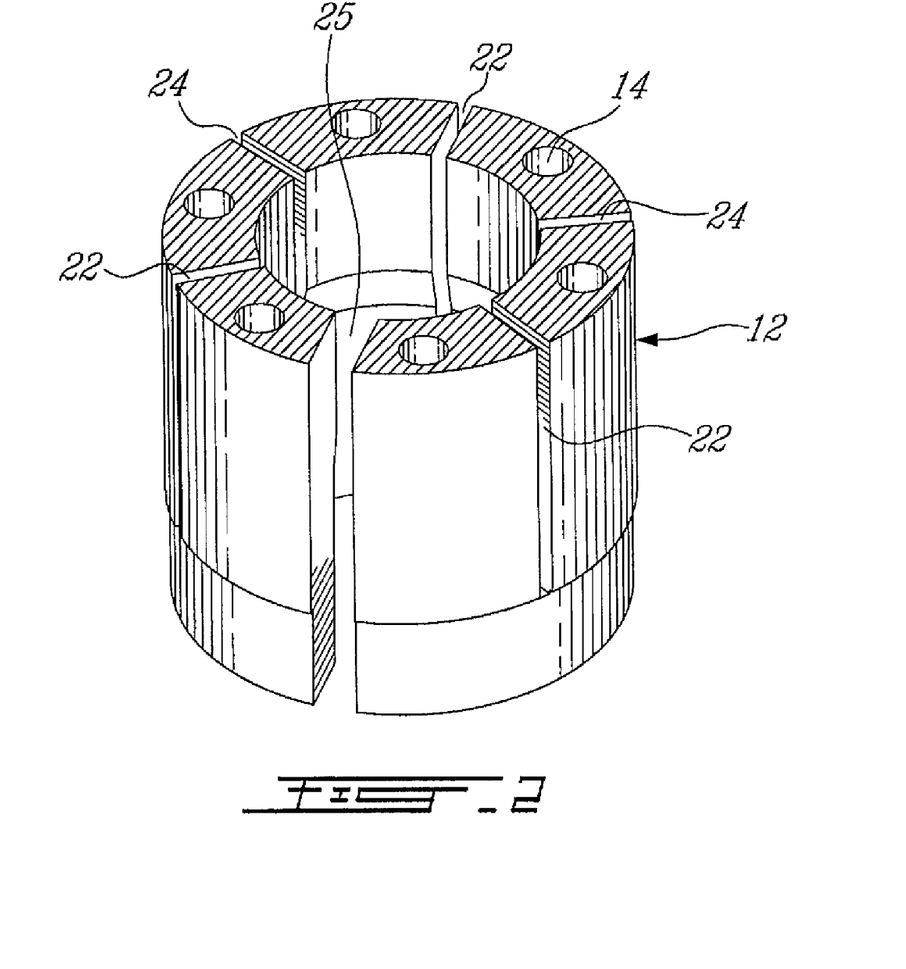
FIG. 2 is a sectional side elevation view taken along line 2-2 of FIG. 1.

FIG. 2 illustrates the cooling tube 14 embedded in the body 12. FIG. 2 also illustrates that each straight portion of the cooling, tube 14 is adjacent to at least one expansion slot 22 or 24.

Figure 3:
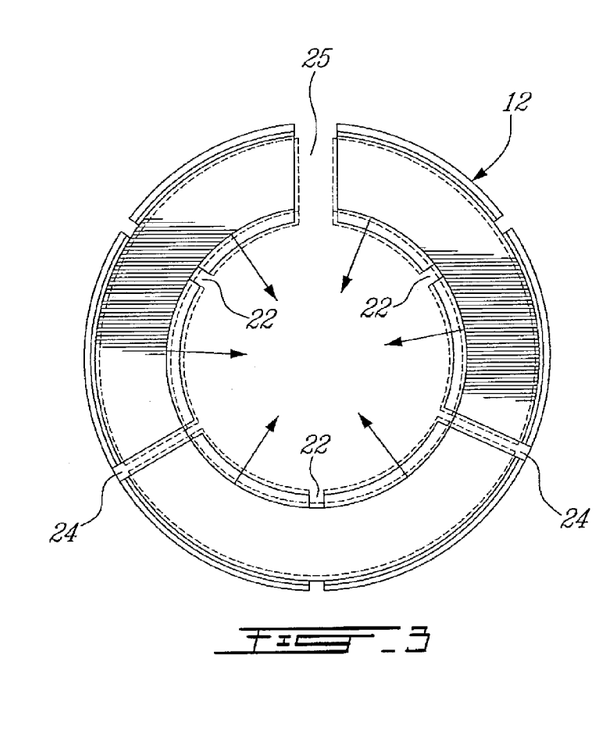
FIG. 3 is a bottom plan view of the liquid cooling arrangement of FIG. 1.
Figure 4:
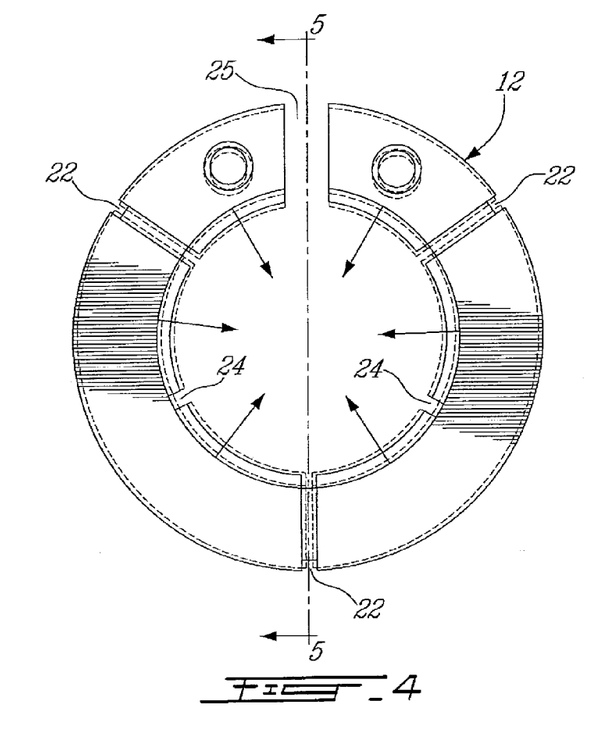
FIG. 4 is a top plan view of the liquid cooling arrangement of FIG. 1.

FIGS. 3 and 4 are respectively bottom and top plan views of the body 12 showing, in dashed lines, the potential deformation for the insertion of the body 12 in an internal stator (not shown).

Figure 5:
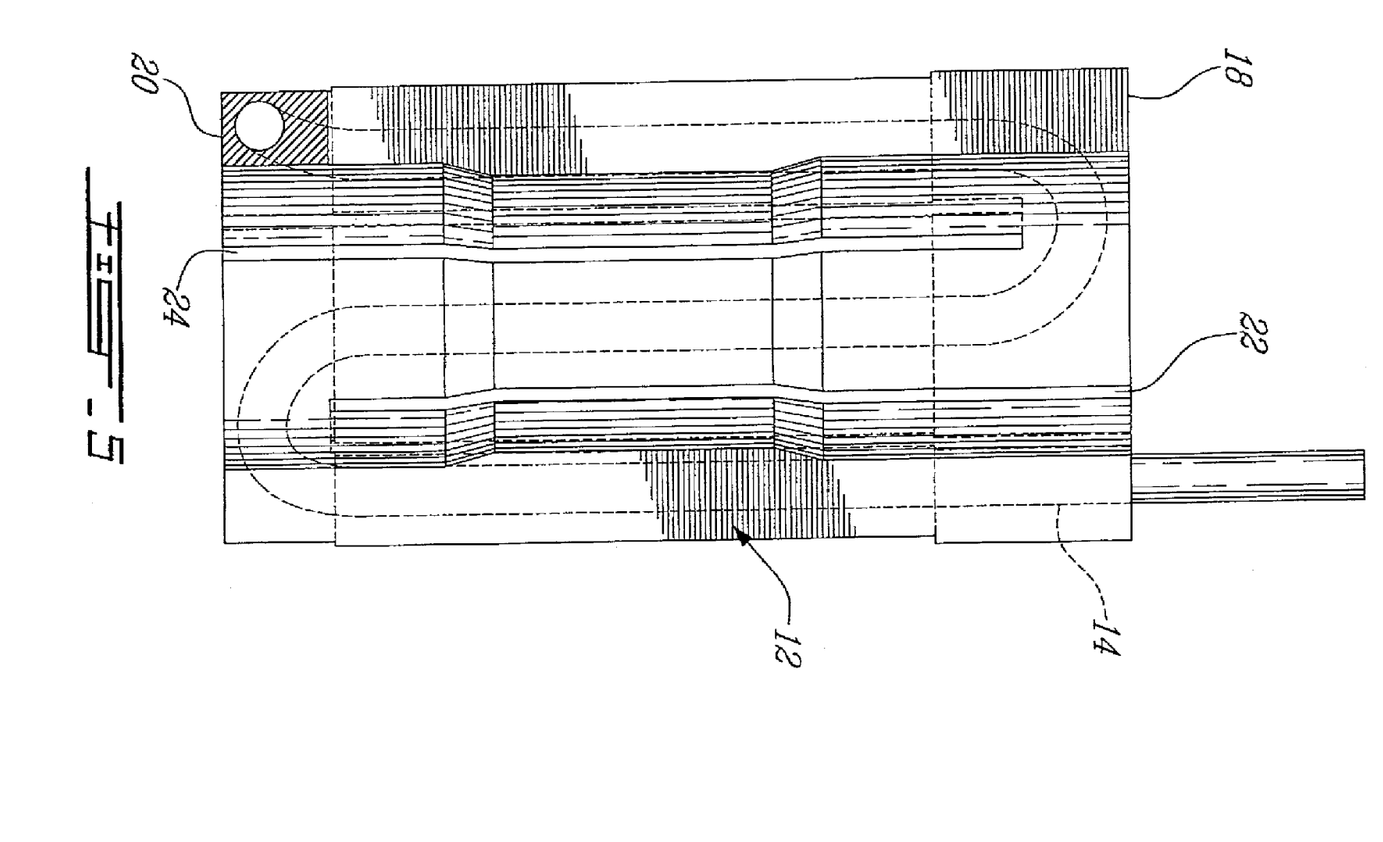
FIG. 5 is a sectional side elevation view taken along line 5-5 of FIG. 4.

FIG. 5 illustrates, in dashed lines, the cooling tube 14 embedded in the body 12. As can be seen from this figure, the expansion slots 22 and 24 are provided in U-shaped portions of the serpentine cooling tube 14 to allow a continuous cooling tube 14 while providing expansion slots open to either longitudinal end of the body 12.

Figure 6:
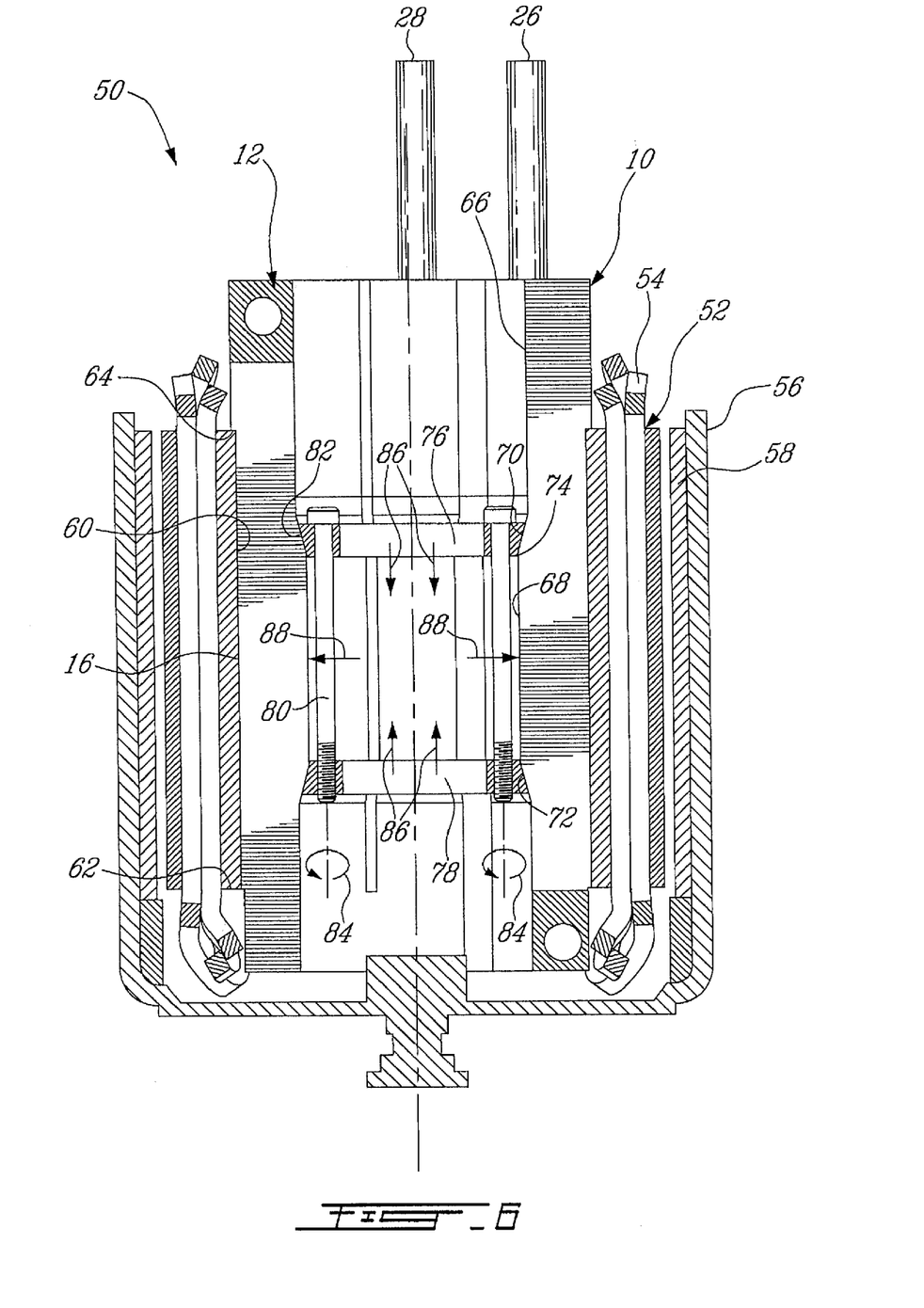
FIG. 6 is a sectional view of an electric machine provided with the liquid cooling arrangement of FIG. 1.

FIG. 6 schematically illustrates portions of an electric machine 50 provided with the liquid cooling arrangement 10. The electric machine 50 includes a stator 52 provided with coils 54 and a rotor 56 provided with permanent magnets 58.

The stator 52 includes a generally cylindrical inner surface 60 against which a portion of the outer surface 16 of the cooling arrangement 10 is applied. A bottom shoulder 62 of the stator 52 and a top shoulder 64 of the body 12 ensure a proper insertion of the cooling arrangement 10 in the stator 52. Of course, the shoulders 62 and 64 could be different than those illustrated herein.

As can be seen on the sectional FIG. 6, the internal surface 66 of the body 12 includes a central constriction 68 defined by two angled wall portions 70 and 72.

FIG. 6 also illustrates an internal biasing assembly 74 used to bias the external surface 16 of the tubular body 12 against the internal surface 60 of a stator 52. The biasing assembly 74 is provided with first and second rings 76, 78 and a plurality of fasteners 80 (two shown in FIG. 6) interconnecting the first ring 76 to the second 78. The outside peripheral walls 82 of the rings 76 and 78 are so angled as to generally correspond to the angle wall portions 70 and 72.

Accordingly, once the cooling arrangement 10 is slightly deformed to be inserted in the stator 12, thanks to the expansion slots 22 and 24 and the slot 25, the fasteners 80 can be tightened (see arrows 84) causing the rings 76 and 78 to be pulled towards one another (see arrows 86). The interaction of the angled walls 82, 70 and 72 deforms the body 12 so as to push the outer wall 16 of the body 12 onto the inner surface 60 of the stator 52 (see arrows 88). Accordingly, an adequate heat transfer is realized between the stator 52 and cooling arrangement 10.

The expansions slots 22 and 24 allow the stator 52 and the cooling arrangement 10, made of dissimilar materials, to thermally expand and/or contract at different rates without causing non-elastic deformation of these elements and while keeping an adequate contact therebetween to allow for an adequate heat transfer.

The rings 76 and 78 can be made of the same material as the stator 52, typically steel, to thermally expand and contract at the same rate thereof.

Of course, other fastening arrangements could be used. For example, the fasteners 80 of FIG. 6 could be replaced by rivets (not shown), provided that compressing means (not shown) are used to temporarily maintain the rings 76 and 78 towards one another while the rivets are installed.

As will easily be understood by one skilled in the art, other mechanisms mounted inside the tubular body and designed to provide an outwardly directed radial force could be used to bias the external surface of the tubular body against the internal surface of the stator.

It will easily be understood by those skilled in the art that both the cooling tube 14 and the body 12 can be made of many adequate heat transfer material. For example, the cooling tube 14 could be made of stainless steel while the body 12 could be made of aluminum. Of course, other materials such as, for example, copper for the tube and cast iron, plastic, zinc or magnesium for the body could be used. One skilled in the art will be in a position to select compatible materials for the tube and body.

Figure 7:
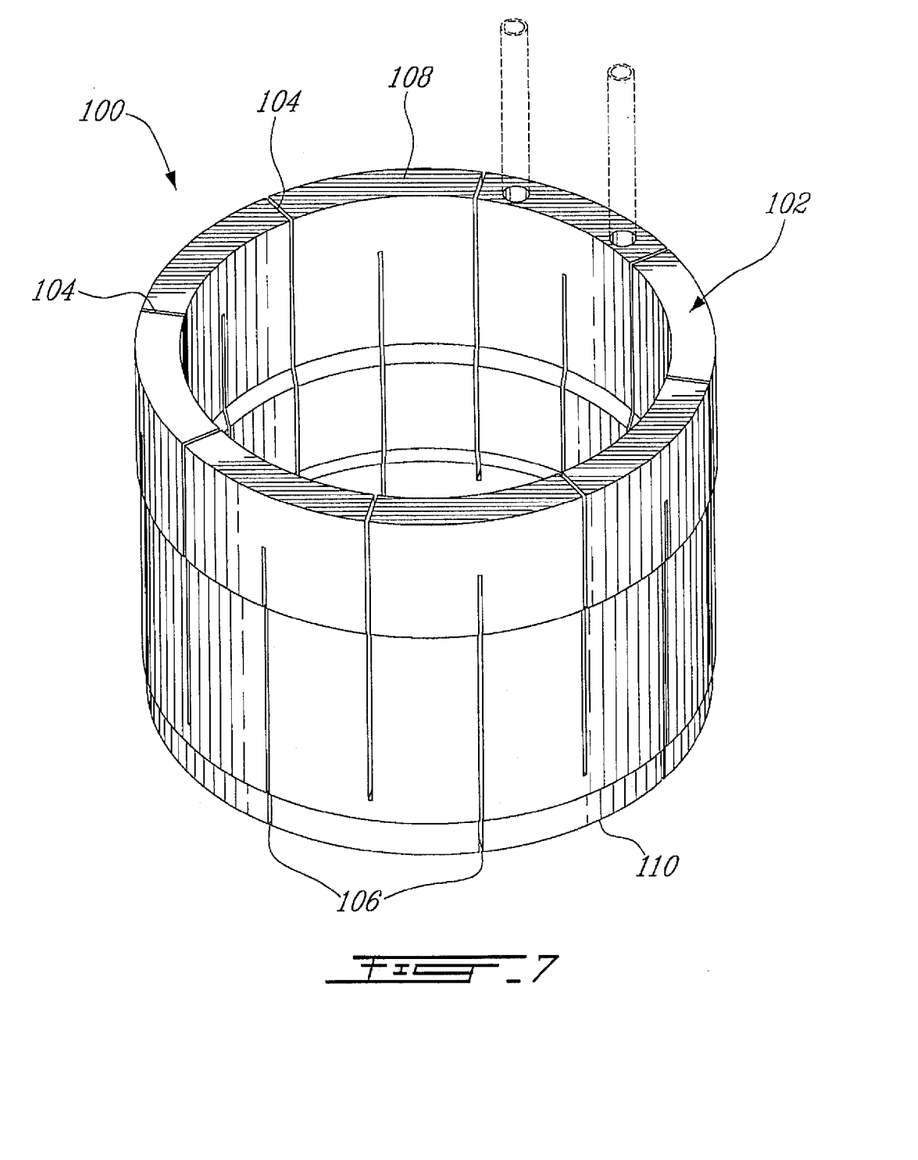
FIG. 7 is a perspective view of a liquid cooling arrangement according to a second illustrative embodiment.

Turning now to FIG. 7, a liquid cooling arrangement 100 according to a second illustrative embodiment will be described. It is to be noted that since the liquid cooling arrangements 10 and 100 are very similar, and for concision purpose, only the differences between these liquid cooling arrangements will be described hereinbelow.

The main difference between the cooling arrangements 100 and 10 resides in the proportions of the cooling arrangement. Indeed while the cooling arrangement 10 was designed for small diameter electric machines, the cooling arrangement 100 is designed for larger diameter electric machines. Accordingly, the tubular body 102 has a larger diameter and is provided with more expansion slots 104 and 106 from both longitudinal ends 108 and 110 of the body 102.

Another interesting difference is that the body 102 of the liquid cooling arrangement 100 is not C-shaped. The increased number of slots allows a more substantial deformation of the body 102, allowing it to be inserted in a stator and subsequently forced against the internal surface of the stator without requiring the body 102 to be C-shaped.

Figure 8:
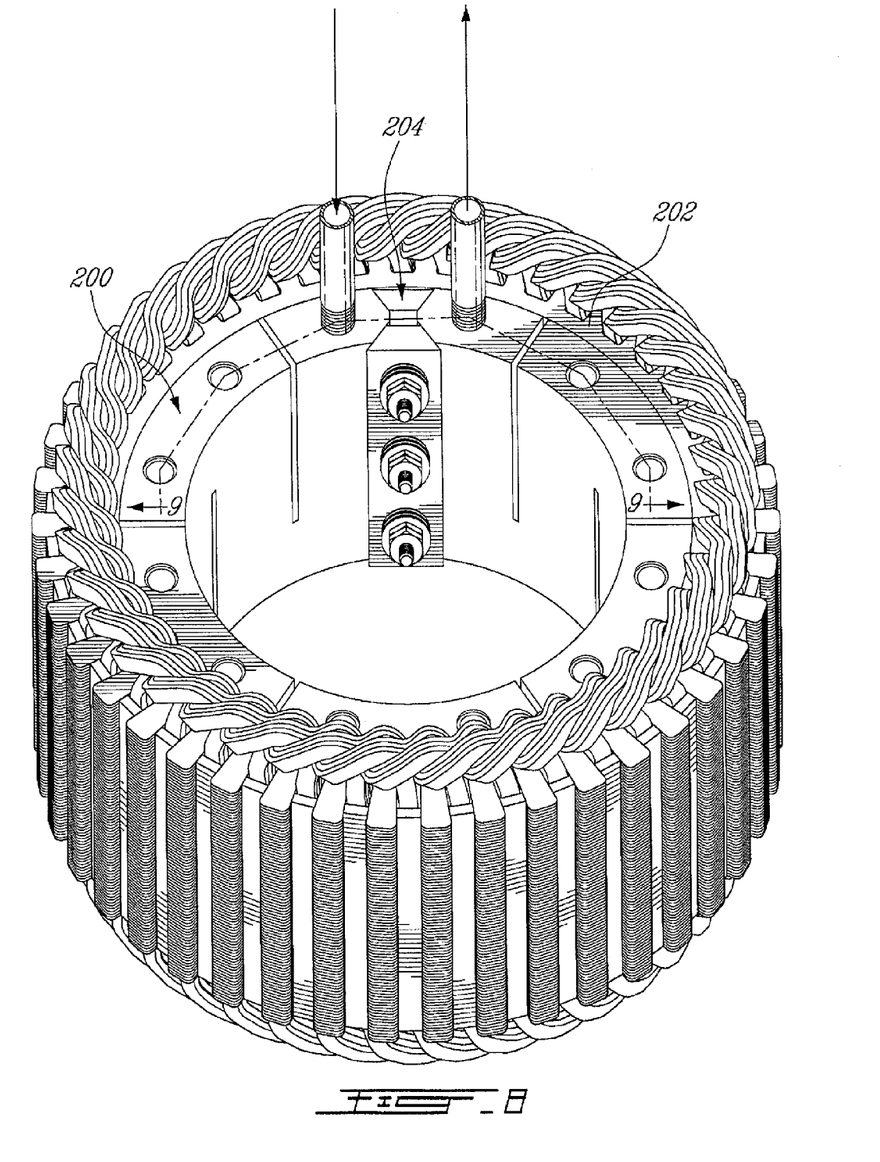
FIG. 8 is a perspective view illustrating a stator provided with a liquid cooling arrangement according to a third illustrative embodiment.
Figure 9:
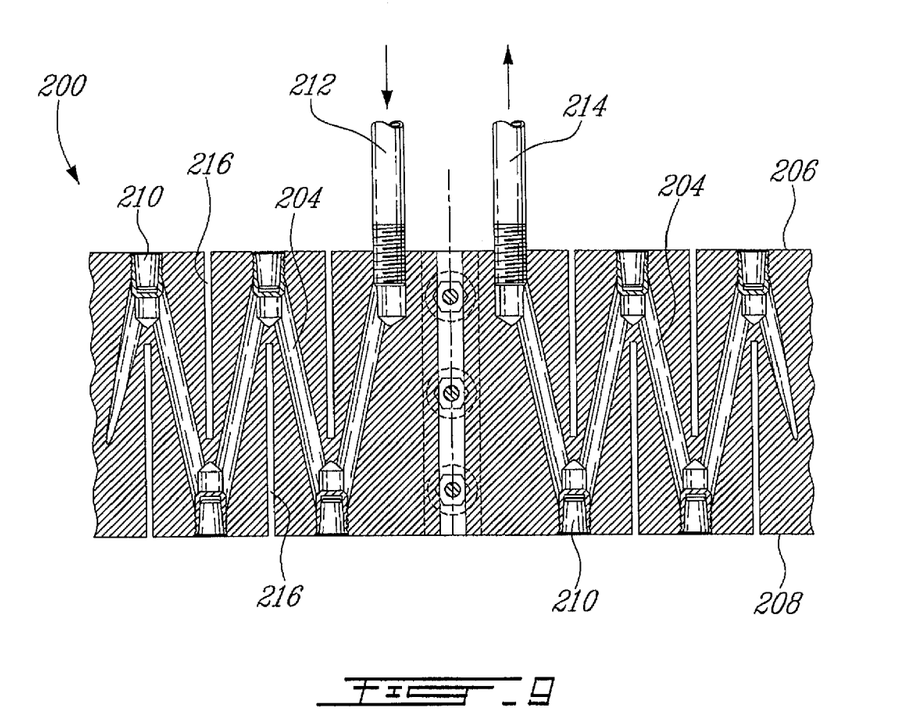
FIG. 9 is a sectional view taken along line 9-9 of FIG. 8.

Turning now to FIGS. 8 and 9 of the appended drawings, a liquid cooling arrangement 200 according to a third illustrative embodiment will be described. The liquid cooling arrangement 200 is very similar to the liquid cooling arrangements 10 and 100 illustrated in FIGS. 1 to 7. Accordingly, only the differences therebetween will be described hereinbelow.

As is apparent from FIG. 8 the biasing assembly 204 used to apply the external surface of the cooling assembly 200 onto the internal surface of the stator 202 is different from the biasing assembly described hereinabove. The biasing assembly illustrated in FIG. 8 is described in U.S. Pat. No. 6,960,851 entitled "Cooling device including a biasing element" and naming Poulin et al. as inventors. This document is incorporated by reference herein in its entirety.

The liquid cooling arrangement 200 is not provided with embedded tubes. As can be seen from FIG. 9, the liquid cooling arrangement 200 includes a plurality of bores that are drilled at an angle to define V-shaped channels, and are spaced such that adjacent V-shaped channels intersect.

More specifically, each angled bore 205 is open to both longitudinal ends 206 and 208 of the liquid cooling arrangement 200. Adjacent bores are closed by deformable plugs 210 to form a cooling path from an inlet 212 to an outlet 214. Expansion slots 216 are provided on both longitudinal ends 206, 208 of the arrangement 200 between the plugs 210. Accordingly, the cooling path is not disturbed by the expansion slots.

Such a configuration of bores and plugs is described in U.S. Pat. No. 7,474,021 entitled "Cooling assembly for electric machine" and naming Didier Perrin as inventor. This document is incorporated by reference herein in its entirety.

Figure 10:
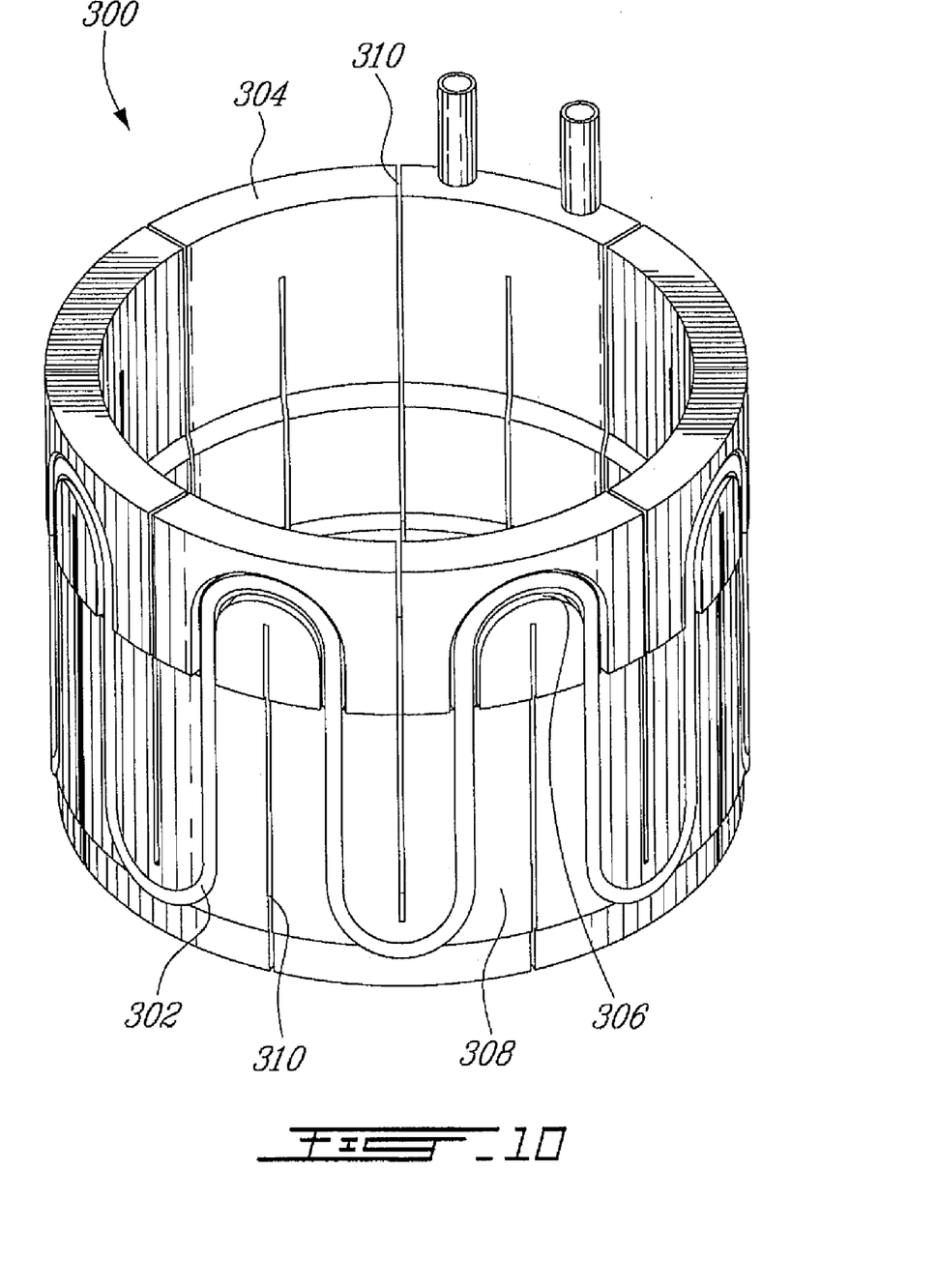
FIG. 10 is a perspective view of a liquid cooling arrangement according to a fourth embodiment.

Turning now to FIG. 10 of the appended drawings, a liquid cooling arrangement 300 according to a fourth illustrative embodiment will be described. It is to be noted that the liquid cooling arrangement 300 is similar to the liquid cooling arrangement 100 illustrated in FIG. 7. Accordingly, only the differences therebetween will be described hereinbelow.

The cooling path of the liquid cooling arrangement 300 is defined by a cooling tube 302 that is not embedded in the tubular body 304 but is inserted and deformed in a serpentine channel 306 provided on the external surface 308 of the tubular body 304. The serpentine channel 306 has a generally C-shaped cross-section.

The continuous cooling tube 302 is therefore in physical contact with both the body 304 and the stator (not shown), when the liquid cooling arrangement 300 is inserted in a stator.

Again, the expansion slots 310 are provided between the longitudinal portions of the cooling tube 302 to prevent interference therebetween.

Such a cooling tube configuration described in U.S. Pat. No. 6,992,411, entitled "Liquid cooling arrangement for electric machines" and naming Houle et al. as inventors. This document is incorporated by reference herein in its entirety.

Figure 11:
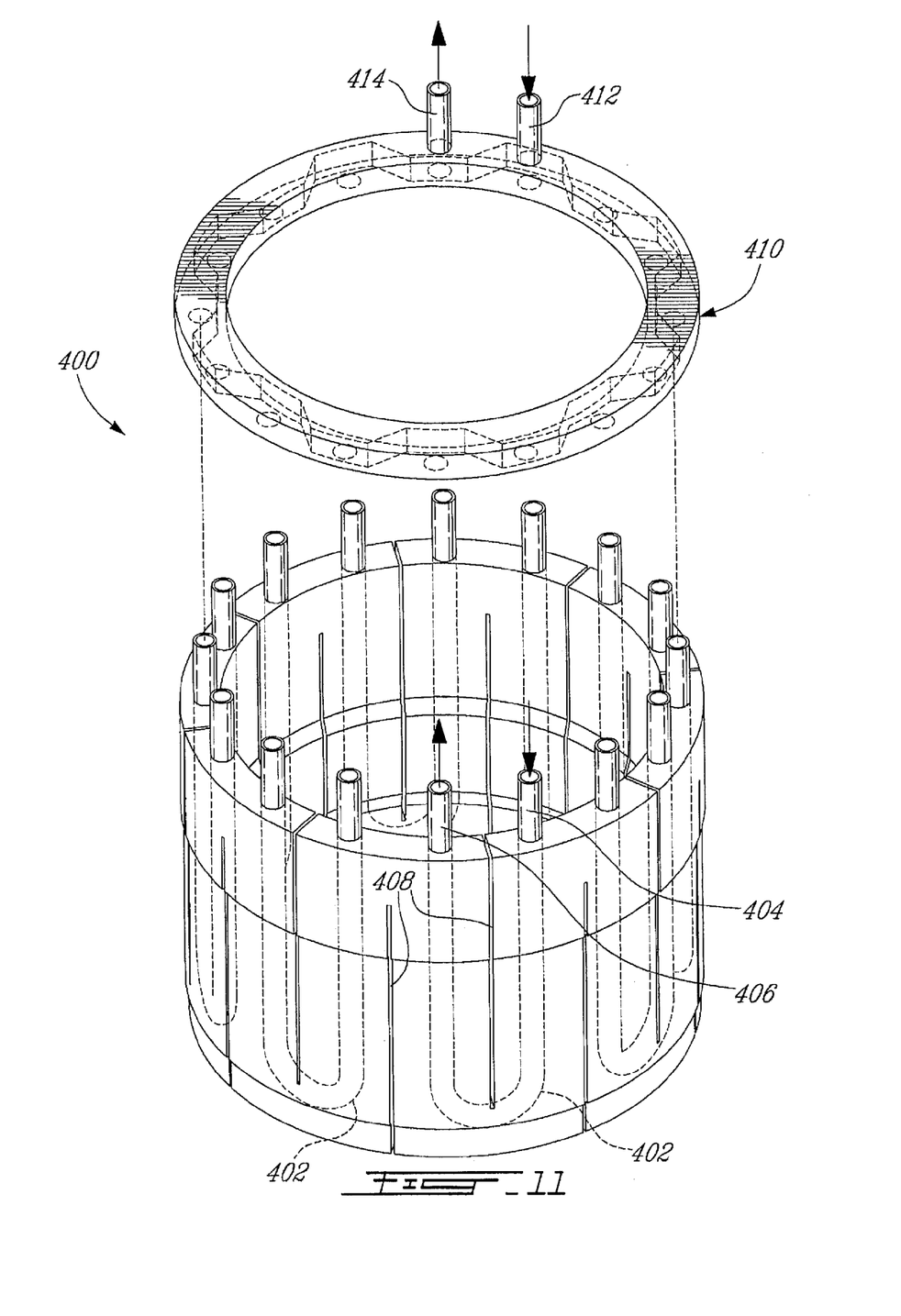
FIG. 11 is a perspective view of a liquid cooling arrangement according to a fifth embodiment.

Finally, turning to FIG. 11 of the appended drawings, a liquid cooling arrangement 400 according to a fifth illustrative embodiment will be described. Again, since the liquid cooling arrangement 400 is similar to the liquid cooling arrangement 100 illustrated in FIG. 7, only the differences therebetween will be described hereinbelow.

The cooling path of the liquid cooling arrangement 400 includes eight U-shaped cooling tubes 402 each including a fluid inlet 404 and a fluid outlet 406. Expansion slots 408 are provided either between the U-shaped cooling tubes 402 or between the longitudinal legs thereof so as to not interfere with the operation of the cooling tubes 402.

The cooling path also includes a manifold 410 provided with a fluid inlet 412 and a fluid outlet 414 and mounted to the inlets 404 and outlets 406 of the cooling tubes 402 to provide a single inlet and outlet for the liquid cooling arrangement 400. It is to be noted that the manifold 410 is schematically illustrated in FIG. 10.

Of course, one skilled in the art will understand that the number of U-shaped cooling tubes 402 can be changed.

It is to be noted that while the external surfaces of the cooling arrangement bodies is shown herein as having shoulders defining different body diameters, straight cylindrical outside surfaces could be used. As will be easily understood by one skilled in the art the external surface of the body of the cooling arrangement generally corresponds to the internal surface of the stator of the electric machine to provide an adequate contact therebetween.

While cylindrical shaped cooling arrangements have been described above, other shapes, such as polygons, could be used for the outer surface of the cooling arrangement and for the inner surface of the stator. Of course, the shape of these surfaces must correspond to provide an adequate contact and hence heat transfer.

It is also to be noted that heat transfer materials such as adhesive, thermal grease or thermal pads could be provided between the external surface of the body and the internal surface of the stator to improve the heat transfer from the stator to the liquid cooling arrangement.

It is to be understood that the invention is not limited in its application to the details of construction and parts illustrated in the accompanying drawings and described hereinabove. The invention is capable of other embodiments and of being practiced in various ways. It is also to be understood that the phraseology or terminology used herein is for the purpose of description and not limitation. Hence, although the present invention has been described hereinabove by way of illustrative embodiments thereof, it can be modified, without departing from the spirit, scope and nature of the subject invention as defined in the appended claims.

What is claimed is:

1. A liquid cooling arrangement to be inserted in the internal stator of an electric machine, the internal stator being provided with an internal surface, the liquid cooling arrangement comprising:
    a tubular body provided first and second longitudinal ends and an external surface so configured and sized as to be applied to the internal surface of the internal stator; the first and second longitudinal ends include expansion slots allowing deformation of the tubular body; the tubular body also includes a cooling path provided with a fluid inlet and a fluid outlet; and
    a biasing assembly so configured and sized as to bias the external surface of the tubular body against the internal surface of the internal stator.

2. A liquid cooling arrangement as recited in claim 1, wherein the tubular body is C-shaped.

3. A liquid cooling arrangement as recited in claim 2, wherein the C-shaped tubular body includes a slot extending from the first longitudinal end to the second longitudinal end and wherein the biasing assembly is mounted to the slot.

4. A liquid cooling arrangement as recited in claim 1, wherein the cooling path is defined by a cooling tube embedded in the tubular body.

5. A liquid cooling arrangement as recited in claim 4, wherein the embedded cooling tube is a continuous serpentine cooling tube.

6. A liquid cooling arrangement as recited in claim 1, wherein the external surface of the tubular body includes a serpentine channel and wherein the cooling path is defined by a cooling tube inserted in the serpentine channel.

7. A liquid cooling arrangement as recited in claim 6, wherein the serpentine channel has a generally C-shaped cross-section.

8. A liquid cooling arrangement as recited in claim 1, wherein the cooling path is defined by at least two generally U-shaped cooling tubes interconnected by a manifold providing the fluid inlet and the fluid outlet of the cooling path.

9. A liquid cooling arrangement as recited in claim 8, wherein the at least two generally U-shaped cooling tubes are defined by two longitudinal legs interconnected by an integral elbow; the expansion slots of the first longitudinal end of the tubular body are provided between the longitudinal legs while the expansion slots of the second longitudinal end of the tubular body are provided between adjacent generally U-shaped cooling tubes.

10. A liquid cooling arrangement as recited in claim 1, wherein the cooling path is defined by a plurality of angled bores in the tubular body; the angled bores are open to both the first and second longitudinal end of the tubular body; adjacent bores are closed by deformable plugs to form a cooling path from the fluid inlet to the fluid outlet.

11. A liquid cooling arrangement as recited in claim 1, wherein the tubular body includes an internal surface and wherein the biasing assembly is an internal biasing assembly mounted to the internal surface of the tubular body and configured and sized to provide an outwardly directed biasing force to apply the external surface of the tubular body against the internal surface of the stator.

12. A liquid cooling arrangement as recited in claim 11, wherein the internal surface provided with a constriction defined by first and second angled wall portions; the internal biasing assembly includes first and second rings each provided with an angled peripheral wall configured and sized to contact a respective angled wall portion of the tubular body, and with at least two fasteners interconnecting the first and second rings; wherein the at least two fasteners are so mounted to the first and second rings that rotation of the fasteners forces the second ring towards the first ring thereby applying an outwardly directed biasing force to apply the external surface of the tubular body against the internal surface of the stator.

13. A liquid cooling arrangement as recited in claim 12, wherein the first and second rings are made of the same material as the stator to thereby thermally expand and contract at about the same rate.

14. A liquid cooling arrangement as recited in claim 12, wherein the first ring includes apertures configured to allow the fasteners therethrough and wherein the second ring includes threaded apertures configured and sized to receive a threaded portion of the fasteners.

15. An electric machine comprising:
an internal stator provided with an internal surface;
an external rotor coaxially mounted about the internal stator; and
a liquid cooling arrangement inserted in the internal stator, the liquid cooling arrangement comprising:
a tubular body provided first and second longitudinal ends and an external surface so configured and sized as to be applied to the internal surface of the internal stator; the first and second longitudinal ends include expansion slots allowing deformation of the tubular body; the tubular body also includes a cooling path provided with a fluid inlet and a fluid outlet; and
a biasing assembly so configured and sized as to bias the external surface of the tubular body against the internal surface of the internal stator.

16. An electric machine as recited in claim 15, wherein the tubular body is C-shaped.

17. An electric machine as recited in claim 16, wherein the C-shaped tubular body includes a slot extending from the first longitudinal end to the second longitudinal end and wherein the biasing assembly is mounted to the slot.

18. An electric machine as recited in claim 15, wherein the cooling path is defined by a cooling tube embedded in the tubular body.

19. An electric machine as recited in claim 18, wherein the embedded cooling tube is a continuous serpentine cooling tube.

20. An electric machine as recited in claim 15, wherein the external surface of the tubular body includes a serpentine channel and wherein the cooling path is defined by a cooling tube inserted in the serpentine channel.

21. An electric machine as recited in claim 20, wherein the serpentine channel has a generally C-shaped cross-section.

22. An electric machine as recited in claim 15, wherein the cooling path is defined by at least two generally U-shaped cooling tubes interconnected by a manifold providing the fluid inlet and the fluid outlet of the cooling path.

23. An electric machine as recited in claim 22, wherein the at least two generally U-shaped cooling tubes are defined by two longitudinal legs interconnected by an integral elbow; the expansion slots of the first longitudinal end of the tubular body are provided between the longitudinal legs while the expansion slots of the second longitudinal end of the tubular body are provided between adjacent generally U-shaped cooling tubes.

24. An electric machine as recited in claim 15, wherein the cooling path is defined by a plurality of angled bores in the tubular body; the angled bores are open to both the first and second longitudinal end of the tubular body; adjacent bores are closed by deformable plugs to form a cooling path from the fluid inlet to the fluid outlet.

25. An electric machine as recited in claim 15, wherein the tubular body includes an internal surface and wherein the biasing assembly is an internal biasing assembly mounted to the internal surface of the tubular body and configured and sized to provide an outwardly directed biasing force to apply the external surface of the tubular body against the internal surface of the stator.

26. An electric machine as recited in claim 25, wherein the internal surface provided with a constriction defined by first and second angled wall portions; the internal biasing assembly includes first and second rings each provided with an angled peripheral wall configured and sized to contact a respective angled wall portion of the tubular body, and with at least two fasteners interconnecting the first and second rings; wherein the at least two fasteners are so mounted to the first and second rings that rotation of the fasteners forces the second ring towards the first ring thereby applying an outwardly directed biasing force to apply the external surface of the tubular body against the internal surface of the stator.

27. An electric machine as recited in claim 26, wherein the first and second rings are made of the same material as the stator to thereby thermally expand and contract at about the same rate.

28. An electric machine as recited in claim 26, wherein the first ring includes apertures configured to allow the fasteners therethrough and wherein the second ring includes threaded apertures configured and sized to receive a threaded portion of the fasteners.

* * * * *